Aug. 19, 1969  M. D. PAPINEAU ET AL  3,462,729
PASSIVE SONAR BEARING AND FREQUENCY DETECTING
AND INDICATING SYSTEM
Filed April 13, 1964  2 Sheets-Sheet 1

INVENTORS
MILTON D. PAPINEAU
CLAUDE C. ROUTH
BY
ATTORNEYS

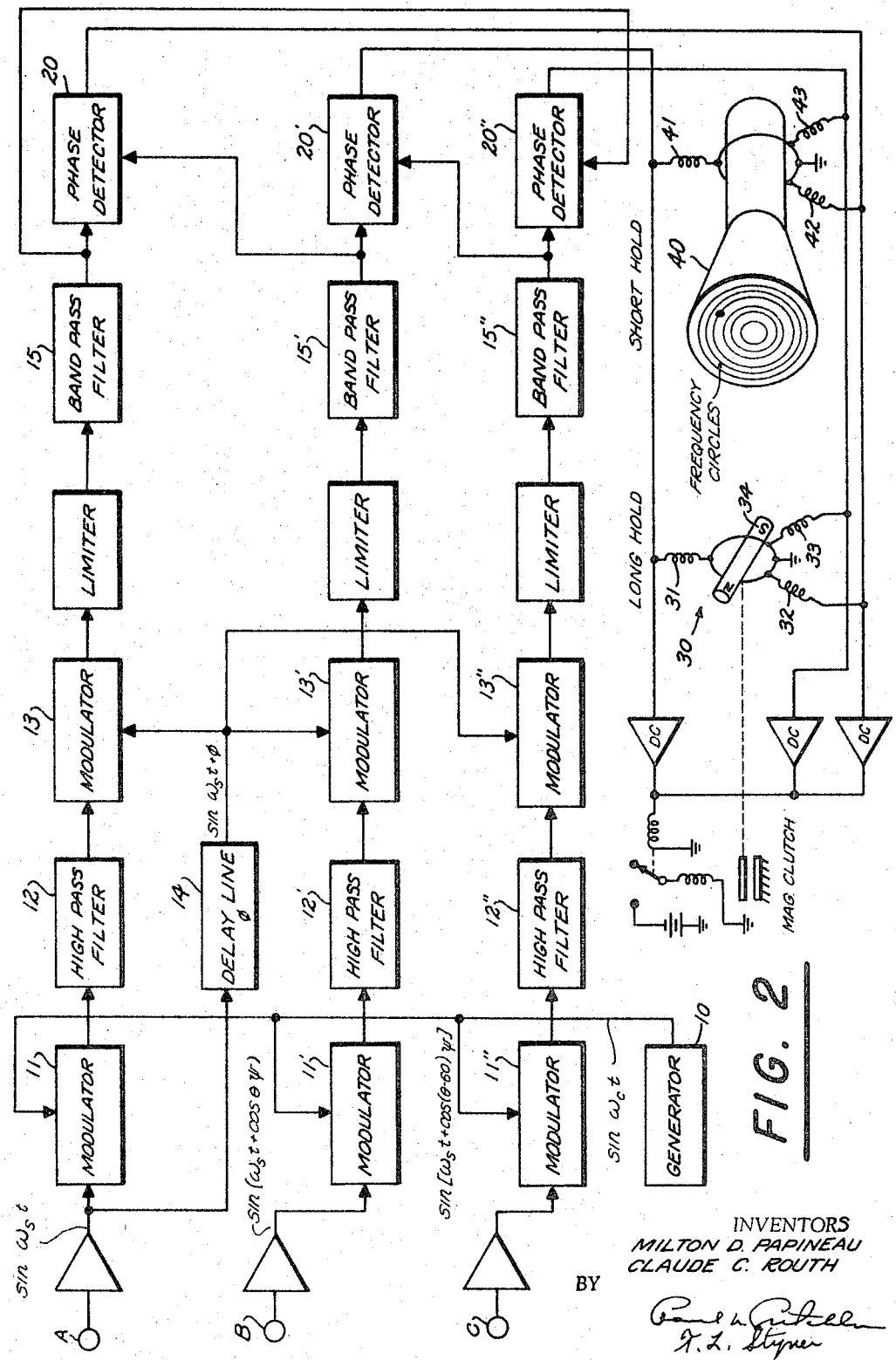

3,462,729
PASSIVE SONAR BEARING AND FREQUENCY
DETECTING AND INDICATING SYSTEM
Milton D. Papineau, Kailua, Hawaii, and Claude C. Routh, San Diego, Calif., assignors to the United States of America as represented by the Secretary of the Navy
Filed Apr. 13, 1964, Ser. No. 360,173
Int. Cl. H04b 13/02
U.S. Cl. 340—6       5 Claims

ABSTRACT OF THE DISCLOSURE

A sonar receiver for determining the bearing and frequency of a sonar ping. The signals are received by three spaced hydrophones, passed through autocorrelation circuitry and three phase detectors. The output signals from the phase detectors are applied to a cathode ray tube with three deflection coils to obtain an indication of the bearing and frequency of the received sonar ping.

---

The invention described herein may be manufactured and used by or for the Government of the United States of America for governmental purposes without the payment of any royalties thereon or therefor.

This invention relates to sonar receiver systems and is particularly directed to passive sonar systems for indicating the bearing and frequency of the received signal when such signal is the usual gated sinusoidal "ping."

Heretofore, the determination of the bearing of a received pulse when the expected direction of the received pulse is not known required more than one transducer.

The object of this invention is to determine the bearing of a received signal even though the signal may be of very short duration and of a single pulse or ping.

In behalf of the omnidirectional transducer, it can be said that noise is received from all directions and is spread over 360° whereas the signal is received from one direction and, hence, results in some signal-to-noise enhancement.

It is a further object of this invention to obtain a signal enhancement in a system using omnidirectional transducers.

The objects of this invention are attained by spacing three omnidirectional transducers equal distances apart, the spacing being small compared to the wave length of the received signals. Each transducer is connected to a receiver, the signal-to-noise ratio of which is enhanced by auto-correlation techniques. Uniquely, a single carrier source is used for each of the three receivers and a common delay line is used for each of the receivers so that phase shifts in the three systems are identical and automatically canceled out. The phase relations of the output signals of the receivers are functions of the transducer spacings, which are fixed, and of the bearing angle of the signal. Phase detectors compare the phase of each receiver output with the outputs of each of the other receivers. The resulting detector currents then may be combined vectorially to indicate signal bearing.

Other objects and features of this invention will become apparent to those skilled in the art by referring to the specific embodiment described in the following specification and shown in the accompanying drawing in which:

FIG. 2 is a block diagram of the system of this invention;

Figure 1:
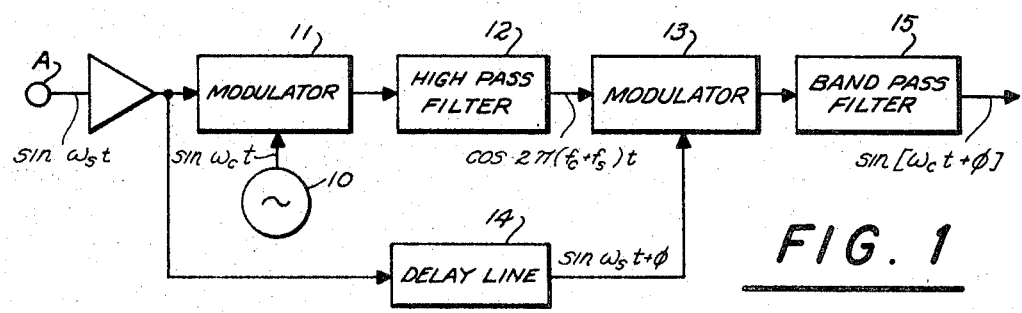
FIG. 1 is a block diagram of an autocorrelator of this invention.

One of the principal components of this invention comprises a heterodyne correlation receiver, or autocorrelator similar to the type disclosed, for example, in U.S. Patent No. 3,064,235. This receiver, shown in block diagram in FIG. 1, receives from hydrophone A a coherent signal of frequency $F_s$. The signal is combined in ring modulator 11 with the locally generated carrier, $F_c$, injected from the local oscillator 10. When the signal $F_s$ is a sine wave, sin $\omega_1 t$, and the carrier is a sine wave, sin $\omega_2 t$, the output signal is $e = E_0(1 + E_a/E_0 \sin \omega_1 t) \sin \omega_2 t$. Since there is no interest in relative amplitudes of the sine waves, let $E_0 = 1$ and $E_a/E_0 = \frac{1}{2}$. The above expression for $e$ may be rewritten, $e = $ carrier $+ \frac{1}{2}$ lower sideband $- \frac{1}{2}$ upper sideband. However, since a ring modulator is balanced and the carrier signal is not present in the output only the two sidebands appears in the modulator output. These are: upper sideband $e_u = \cos 2\pi(F_c + F_s)t$ and lower sideband $e_L = \cos 2\pi(F_c - F_s)t$. It will be assumed that the upper sideband only is selected by the highpass filter 12 and is applied to the ring modulator 13. To the second input of the modulator 13 is fed the original signal shifted in phase by the delay line 14, or sin $\omega_s t + \phi$. The correlation delay in the delay line 14 is relatively small compared to the duration of the signal. The relatively narrow bandpass filter 15 centered at the carrier frequency $\omega_c$, will yield an output sin $[\omega_c t + \phi]$. It will be noted that the output of the correlator is the carrier frequency, although the output amplitude depends upon the coherent sinusoidal signal received at the hydrophone A. In the discussion to follow the phase shifting effects of the highpass and bandpass filters are ignored because like filters are used in the parallel correlators of this invention and are assumed to have like characteristics so that in the bearing indicator their effects will cancel out. That is, the outputs of like correlators will be shifted like amounts by the filters and may be ignored.

Figure 3:
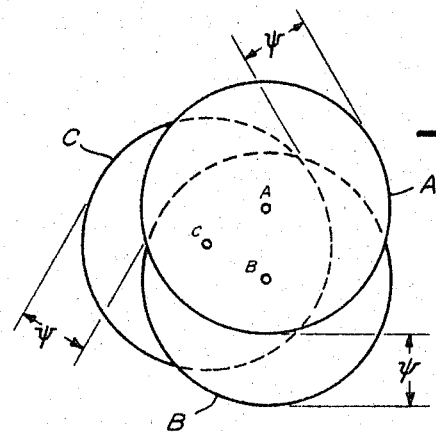
FIGS. 3 and 4 are plan and elevational views respectively, of transducer arrays adaptable to the system of FIG. 1.
Figure 5:
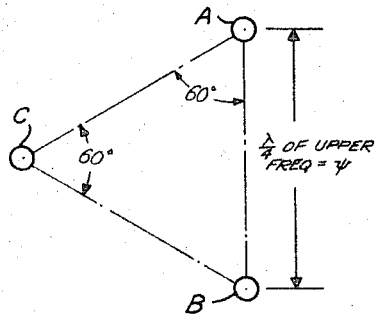
FIG. 5 is the effective spatial layout of the three transducers and their special relations of this invention.
Figure 4:
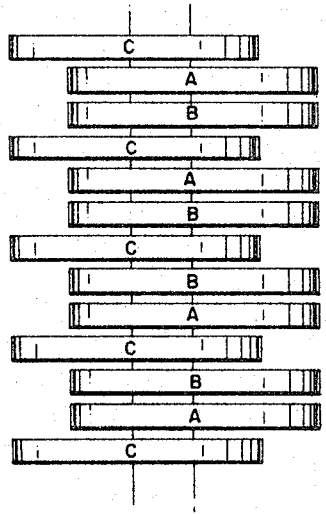

In the system of FIG. 2 of this invention three hydrophones A, B and C are arranged in any array as shown in FIGS. 3, 4 and 5. In this particular array each hydrophone element is a circular disc and is omnidirectional in characteristics. The three discs A, B and C are stacked and staggered so that the centers of the discs are equidistantly spaced. As suggested in FIG. 5, the spacings A–B, B–C, and C–A are about one-quarter of a wave length at the highest operating signal frequency to be received. This distance is here said to be $\psi$. The sets of three discs may be repeated in the stack as desired to increase horizontal resolution, as set forth in the co-pending application of Charles E. Green, Ser. No. 11,113, filed Feb. 25, 1960, now Patent No. 3,182,284.

In FIG. 2 the autocorrelator system is repeated in each of the receivers coupled to hydrophones A, B and C. Uniquely, the injection frequency $\omega_c t$ is obtained from the single local generator 10, the output of which is injected into each of the three ring-type modulators 11, 11', and 11''. Also uniquely, the single correlation delay line 14 is employed for the three receivers. The signal of hydrophone A is delayed and is fed into each of the modulators 13, 13', and 13''. It will appear that by employing a common injection frequency source and a common correlation delay line for all three receivers the relative phases of the correlator outputs faithfully reflect the relative phases of the signals received at the hydrophones. It is an established fact that a phase change in one input to a modulator produces a like change of phase in the output.

At the output of each autocorrelator is connected, respectively, a phase detector 20, 20′, and 20″. The detectors are of any conventional type in which the outputs are a direct current proportional in amplitude to the phase relation of the two sine waves. To the inputs of detector 20 are connected the outputs of receivers A and B. To the inputs of detector 20' are fed the outputs of receivers B and C. To the inputs of detector 20'' are fed the outputs of receivers C and A.

It can be shown that the three direct currents can be combined in a resolver to accurately indicate bearing $\theta$. The signal will vary as the cosine of the source bearing angle ($\theta$) such that the signal from hydrophone B with reference to A and the AB axis as indicated in FIG. 5 will be:

$$\sin [\omega_s t + \cos \theta(\psi)] \quad (1)$$

The signal from hydrophone C with reference to A and the AB axis will be:

$$\sin [\omega_s t + \cos (\theta - 60)\psi] \quad (2)$$

It is apparent that $\theta - 60$ of (2) replaces $\theta$ of (1) because C to have the same output phase as B would have to be rotated 60° counterclockwise about A.

Following the signal through from hydrophone B, the upper sideband output of the first ring modulator 11' will be:

$$\cos [2\pi(f_c + f_s)t + \cos \theta(\psi)] \quad (3)$$

This upper sideband signal when modulated by the delayed hydrophone ($a$) signal, $\sin (\omega_s + \phi)$, gives the lower sideband signal:

$$\sin [2\pi(f_c + f_s - f_s)t + \phi = \cos \theta(\psi)] \quad (4)$$
$$\sin [\omega_c t + \phi + \cos \theta(\psi)] \quad (5)$$

The signal frequency cancels out leaving the phase shifted carrier frequency.

Following the signal $\sin [\omega_c t + \cos (\theta - 60)\psi]$ from hydrophone C through the first modulator we get for the upper sideband:

$$\cos [2\pi(f_c + f_s)t + \cos (\theta - 60)\psi] \quad (6)$$

Modulating this signal, as before, with the delayed hydrophone (A) signal results in a lower sideband of:

$$\sin [2\pi(f_c + f_s - f_s)t + \phi + \cos (\theta - 60)\psi] \quad (7)$$

Again we get a phase shifted carrier frequency;

$$\sin [\omega_c t + \phi + \cos (\theta - 60)\psi] \quad (8)$$

Hence the three outputs of filters 15, 15' and 15'' at the carrier frequency caused by hydrophones A, B and C are:

$$A = \sin [\omega_c t + \phi] \quad (9)$$
$$B = \sin [\omega_c t + \phi + \cos \theta\psi] \quad (10)$$
$$C = \sin [\omega_c t + \phi + \cos (\theta - 60)\psi] \quad (11)$$

Note that all three signals have an equal phase shift due to the correlation delay or phase shift $\phi$. The B output signal differs in phase only from the A output by the amount $\cos \theta\psi$. Thus the amount of phase shift of the B output with aspect to A is a cosine function of the source bearing angle $\theta$. Similarly the C output signal differs in phase from the A output by the amount $\cos (\theta - 60)\psi$. Again, the amount of phase shift of the C output with respect to A is a cosine function of the source bearing angle, $\theta - 60$.

The bearing information is contained in the three fixed frequency outputs in the form of phase shifts. Since the three hydrophones A, B, C form an equilateral triangle one of the base lines, say A–B may be chosen, for illustration purposes, as the reference line from which the 60° angles may be measured. The signal source bearing angle, $\theta$, is obtained from the three outputs by using each output as the phase reference for its clockwise neighbor. Hence, the inputs of the phase detectors are connected as shown.

It will be apparent that for any source bearing, the DC outputs of the three phase detectors 20, 20' and 20'' will have the correct voltage relations one with another for the proper operation of the DC selsyn 30. The three direct currents are vectorially added in the Y-connected windings 31, 32 and 33 to produce a field which will orient the magnet 34 in accordance with the resultant field and accordingly in the direction of the bearing angle. If desired, a magnetic clutch can be employed to lock the indicator magnet 34 in any position after a signal has been received to permanently show the bearing of the received signal. The particular magnetic clutch shown may be operated by the signal of any one of the three phases so that the one first receiving the signal will release the indicator for assuming a new position.

In the phase shift products $\cos \theta\psi$ and $\cos (\theta - 60)\psi$, there are two variables, namely $\theta$ and $\psi$. The source bearing angle $\theta$ is indicated on the resolver 30, as explained. It will be noted, however, that $\psi$ is a phase shift which is a function of the physical spacing of the hydrophones and of wave length of the signal. If in water, $\psi$ is 90° at 100 kc. then $\psi$ will equal 45° at 50 kc. That is, the voltages developed by the three phase detectors will vary with frequency, $\omega_s t$. The frequency information contained in the three detector outputs can be displayed compatibly on an oscilloscope by shifting the beam of the oscilloscope 40 with three 120° deflection coils 41, 42, and 43. The net level of the magnetic field of the three coils will control the radial deflection from the center of the screen, thus indicating frequency by the distance of the beam spot from the center of the screen. Simultaneously, the voltage relationship at the three coils will orient the azimuth of the beam spot for the bearing display. An oscilloscope screen with some persistence can show progressive bearing change of a sound source or display several successive sound sources.

Obviously many modifications and variations of the present invention are possible in the light of the above teachings.

What is claimed is:

1. A sonar direction finder system comprising,
    a plurality of equally spaced omnidirectional hydrophones,
    a plurality of auto-correlation receiving systems, each receiving system consisting of a carrier-suppression modulator, a sideband selection filter, a mixer, and a narrow bandpass filter coupled in cascade, respectively to said hydrophones,
    a single signal delay device coupled between one of said hydrophones and one input terminal of each of the mentioned mixers,
    a single carrier generator, the output of said generator being coupled to one input terminal of said carrier-suppression modulator to comprise hydrophone signals with carrier frequencies and generate upper and lower sideband components, and
    a plurality of phase detectors for comparing the phase relations between the signals passed by each two of said bandpass filters, each detector being capable of generating a voltage proportional to the phase angles being measured, and
    means for vectorially adding said voltages to indicate the direction of signals received by said hydrophones.

2. The phase detector of the system defined in claim 1 having the capability of varying the detector output voltage as a function of the frequency of said signals received by said hydrophones further comprising,
    means for indicating the net detector voltages to show the frequency of the received sonar signal.

3. The method of determining the bearing of a coherent signal received in relatively high noise background comprising,
    simultaneously receiving the signal and noise at three equally spaced transducers the transducer spacing being small compared with the wavelength of the expected coherent signal so that the vectorial sum of the three coherent signals indicates signal bearing, shifting the frequency of the received signal of each transducer an identical amount by a single locally generated carrier wave, delaying the signal of one transducer and combining the delayed signal with each of the shifted frequencies, selecting the carrier frequency from each of the combined signals, comparing the phase of each selected carrier with each of the other carriers and generating a direct current analogous to each phase, and adding said direct currents vectorially to indicate bearing.

4. The method of determining the frequency of a single relatively short sonar ping received at three uniformly spaced hydrophones, said method comprising;

enhancing the signal-to-noise ratio at each hydrophone by auto-correlation, detecting each enhanced signal, determining the phase of each signal with respect to each of the other signals and generating three voltages proportional in amplitude, respectively, with the three measured phase angles, vectorially combining said three voltages along axes corresponding to the angular disposition of said hydrophones, and indicating the length of the resultant vector in terms of said frequency of said relatively short sonar ping.

5. The method defined in claim 4 further comprising the step of;

determining the azimuthal bearing of said sonar signal by indicating the azimuthal orientation of said resultant vector.

References Cited

UNITED STATES PATENTS

| | | | |
|---|---|---|---|
| 3,005,200 | 10/1961 | O'Meara | 343—123 |
| 3,105,193 | 9/1963 | Denton | 324—82 |

RICHARD A. FARLEY, Primary Examiner

U.S. Cl. X.R.

340—16; 343—113